United States Patent [19]

Harmon et al.

[11] Patent Number: 5,392,557
[45] Date of Patent: Feb. 28, 1995

[54] CRANKBAIT STORAGE APPARATUS

[76] Inventors: Samuel R. Harmon, 222 - 19th Pl.; Gilbert E. Johnson, 2009 Roosevelt, both of Clinton, Iowa 52732

[21] Appl. No.: 175,879

[22] Filed: Dec. 30, 1993

[51] Int. Cl.[6] .............................................. A01K 97/06
[52] U.S. Cl. ................................. 43/57.1; 206/315.11
[58] Field of Search ...................... 43/57.1, 57.2, 54.1; D22/134; 206/315.11, 443, 371, 1.9, 3, 564

[56] References Cited

U.S. PATENT DOCUMENTS

| | | | |
|---|---|---|---|
| 520,943 | 6/1894 | Stiefelhagen | 43/57.1 X |
| 2,364,807 | 12/1944 | Nelson, Jr. | 43/57.1 |
| 2,595,051 | 4/1952 | Bryant | 43/57.1 |
| 2,681,201 | 6/1954 | Grunwald | 43/54.1 X |
| 2,723,484 | 11/1955 | Nelson, Jr. | 43/54.1 |
| 3,490,169 | 1/1970 | Tweed | 43/57.1 |
| 3,507,071 | 4/1970 | Bryson | 43/57.1 |
| 3,948,579 | 4/1976 | Schirmer | 206/315.11 X |
| 4,244,660 | 1/1981 | Aronson | 206/443 X |
| 4,467,947 | 8/1984 | Minneman | 206/3 X |
| 5,185,952 | 2/1993 | Bruce | 43/57.1 |

Primary Examiner—Kurt Rowan
Assistant Examiner—Jeanne M. Elpel
Attorney, Agent, or Firm—Henderson & Sturm

[57] ABSTRACT

A crankbait storage apparatus which prevents hook entanglement while economizing on both space and weight requirements. A series of "V" shaped members in a horizontal, spaced apart relation create storage slots for the lures, while a novel bumper arrangement holds the lures in the container when the lid is opened so as to provide quick and easy access to the lures.

10 Claims, 3 Drawing Sheets

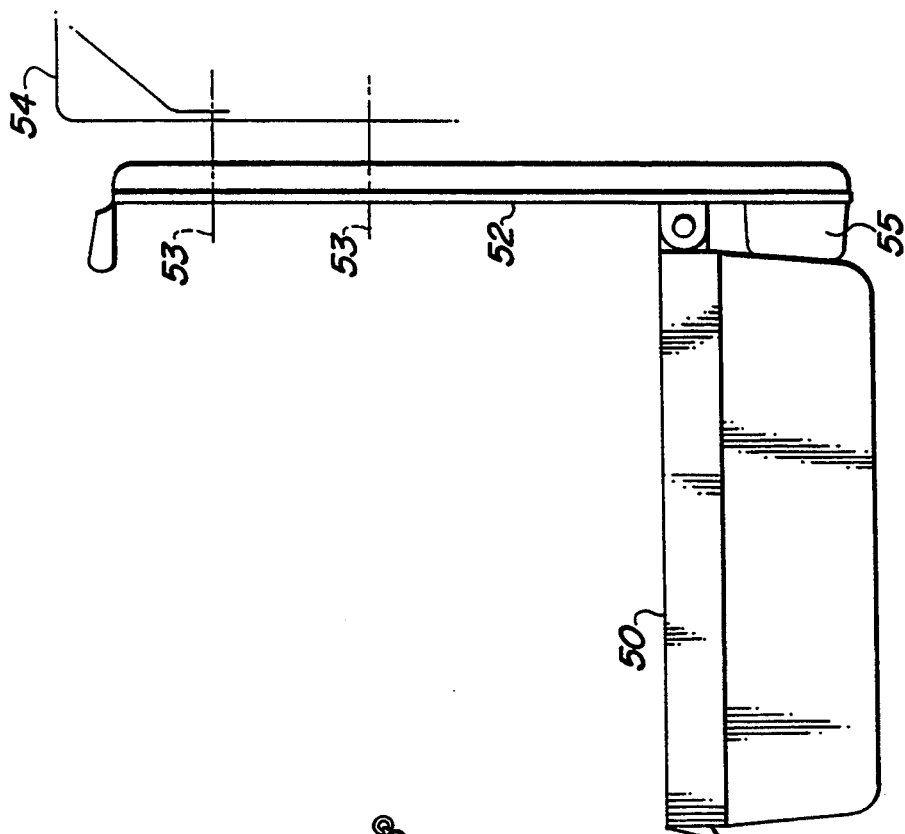
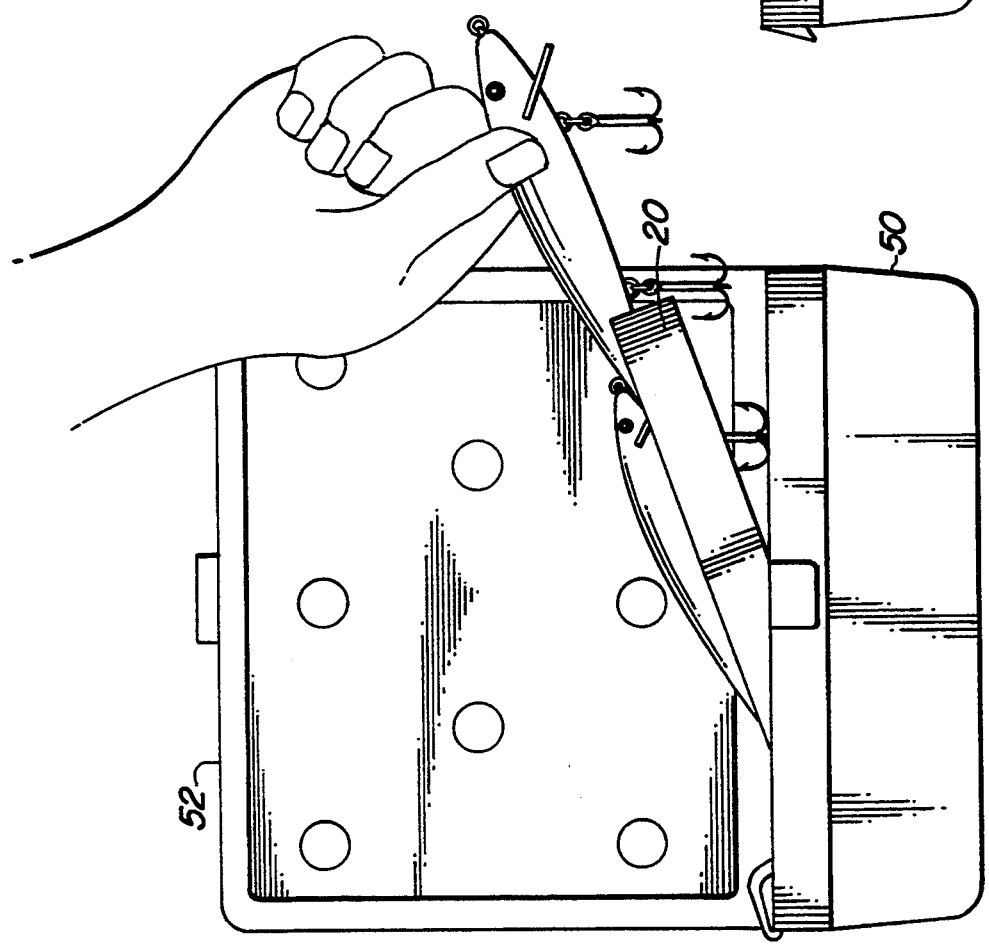

CRANKBAIT STORAGE APPARATUS

TECHNICAL FIELD

The present invention relates to storage devices for fishing lures, and more particularly to a crankbait storage apparatus.

BACKGROUND ART

The fishing lure art is replete with devices for storing lures, ranging from simple compartmentalized tackle boxes to the sophisticated lure storage container of Bruce described in U.S. Pat. No. 5,185,952. The object of many of these devices, particularly those intended for the storage of crankbait lures with treble hooks, is to provide convenient access to the lures while preventing the lure hook from becoming entangled.

DISCLOSURE OF THE INVENTION

The present invention teaches a crankbait storage apparatus which prevents hook entanglement while economizing on both space and weight requirements. A series of V shaped members in a horizontal, spaced apart relation create storage slots for the lures, with the hooks residing below the slots where their movement is impeded so as to prevent entanglement. A slot divider may be fitted into the storage slots to separate a pair of short crankbaits and allow them to be stored within a single slot.

BRIEF DESCRIPTION OF THE DRAWINGS

These and other attributes of the invention will become more clear upon a thorough study of the following description of the best mode for carrying out the invention, particularly when reviewed in conjunction with the drawings wherein:

FIG. 7 is a front elevational view of a second embodiment of the invention; and

FIG. 8 is a side elevational view, partly schematic, showing mounting of this second embodiment to a boat swivel seat.

BEST MODE FOR CARRYING OUT THE INVENTION

Figure 1:
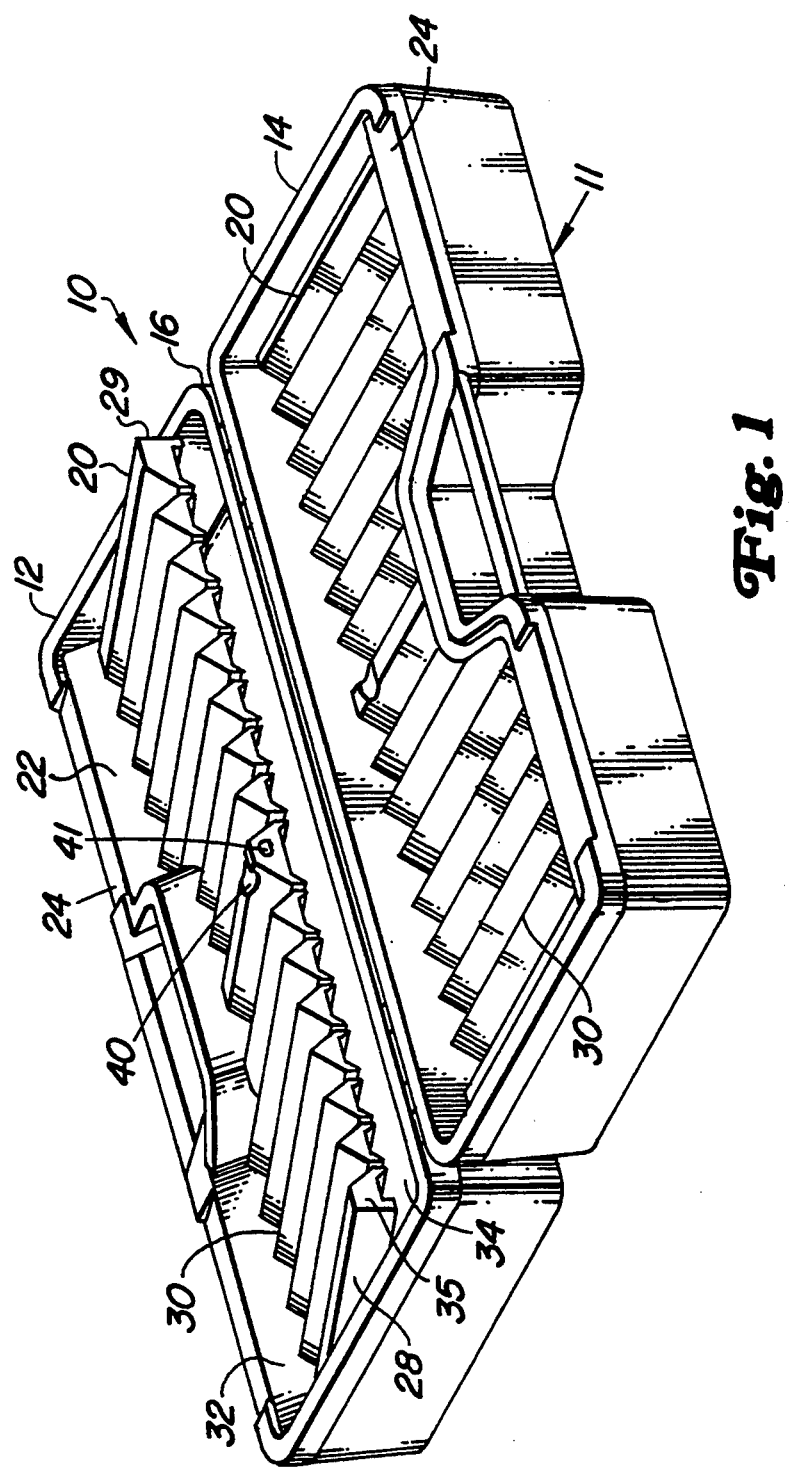
FIG. 1 is an isometric view of a first embodiment of the invention.

Referring now to the drawings, FIGS. 1–4 depict a first embodiment of the invention (10) and the storage of crankbaits (60) therein. The crankbait storage apparatus (10) is preferably blow molded from a plastic material and comprises a carrying case (11) having a first shell (12) and a second shell (14) which are hinged together by a hinge (16). Each of the shells (12), (14) houses a lure storage tray (20) which is molded to a support plate (22) which is in turn pivotally attached to its respective shell by means of a live hinge (24).

The crankbait storage trays (20) each are comprised of a pair of longitudinally spaced apart, generally parallel, elongated end walls (28), (29), and a contiguous series of "V" shaped members (30) which extends between the walls (28), (29), the long axes of which members (30) generally parallel those of the end walls (28), (29). The trays (20) essentially split the shells (12), (14) each into an upper compartment (32) and a lower compartment (34). These "V" shaped members (30) extend from their respective support plates (22), terminate at free end walls (35), and define a series of side by side nests (36). At the bottom of each "V" shaped member (30), an elongated gap (37) is formed extending from the free end of member (30) to adjacent the support plate (22). The walls of each gap (37) are spaced apart sufficiently to permit the shank (61) of the crankbait hooks (62) to extend therebetween, thus permitting the crankbait lure body (63) to rest within a nest (36) in the upper compartment (32) while the hook resides within the lower compartment (34). See FIG. 4. An important aspect of the invention is the minimal width of each gap (37) in combination with the substantial depth of each gap (37). These two considerations act to limit the side to side swing of the lure hooks (62) which serves to reduce hook entanglement. Gap (37) depth is approximately one and one half times the gap (37) width, with the particular measurements dependent upon the size of crankbait lures (60) to be carried. As seen in the upper shell (12) of FIG. 1, the crankbait storage tray (20) is in the raised position to provide access to the storage tray (20) for removing or stowing lures thereon. The tray (20) is conveniently raised by means of a fingerhole (40). When the storage trays (20) are in the down or stowed position, such as depicted in the lower shell (14) of FIG. 1, the carrying case (11) may be closed for transportation. Latching of each tray (20) may be effected by a projection (41), disposed upon a wall (35), which engages an indent (not shown) formed in case shells (12), (14).

Figure 2:
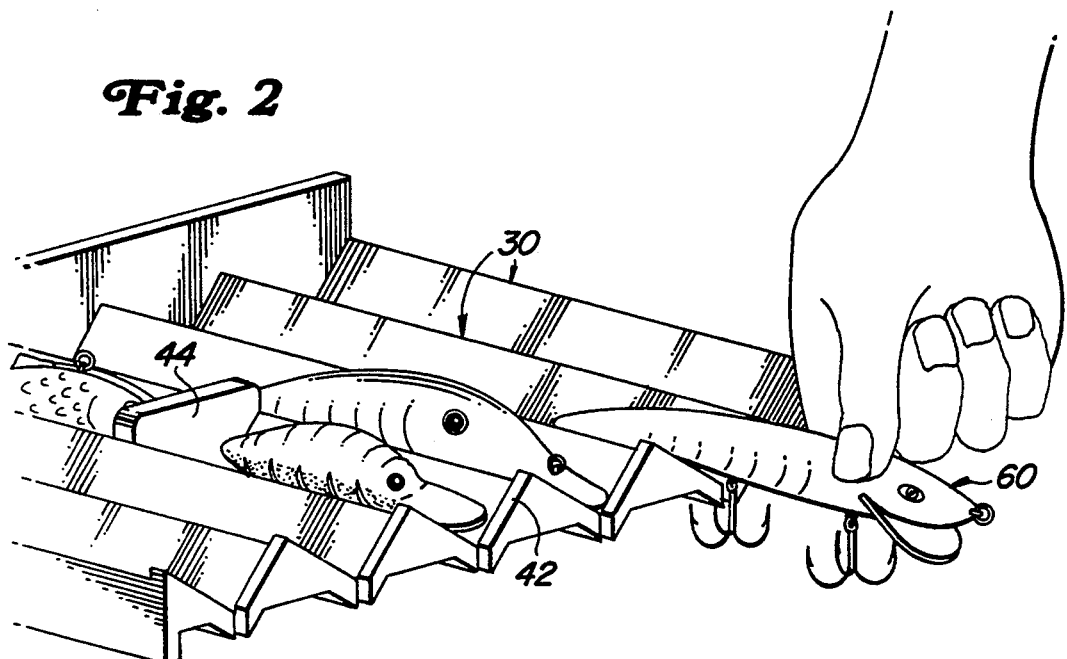
FIG. 2 is an isometric view of the storage tray of the invention.
Figure 3:
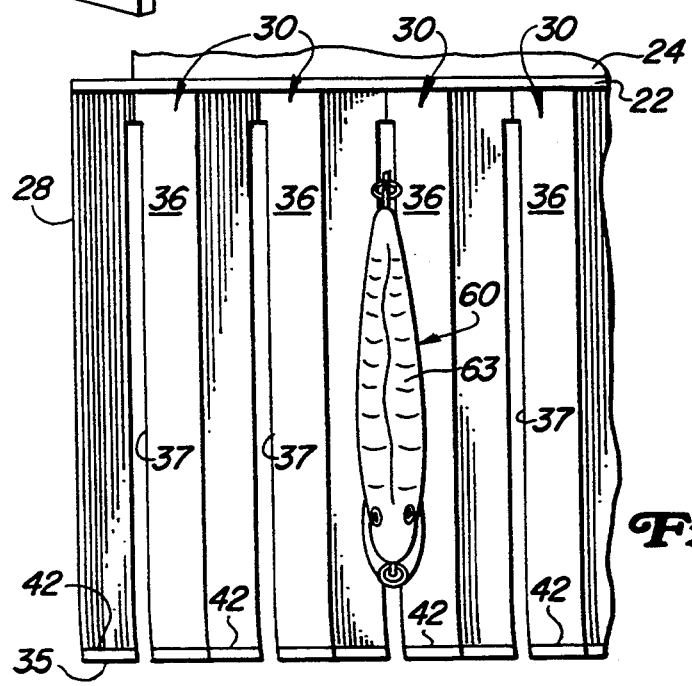
FIG. 3 is a partial top plan view of the storage tray.
Figure 5:
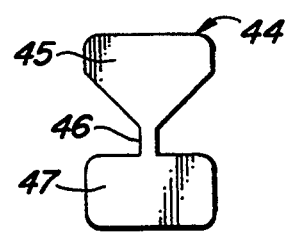
FIG. 5 is an end elevational view of the slot divider.
Figure 4:
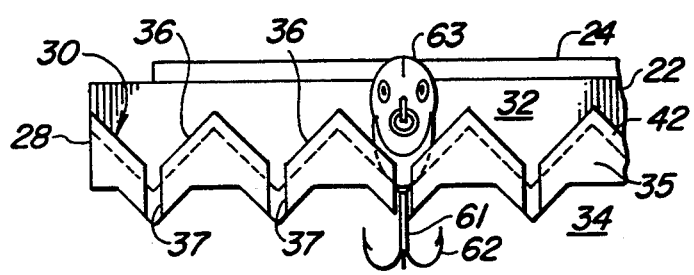
FIG. 4 is an end view of the storage tray.
Figure 6:
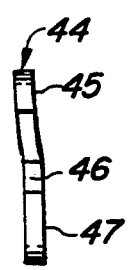
FIG. 6 is a side elevational view of the slot divider.

As is best seen in FIGS. 2, 3 and 4 the free ends (35) of the "V" shaped members (30) may have a lip (42) molded on to their upper surface to help retain the lures within their nests and prevent the lures (60) from inadvertently sliding off of the storage trays (20). Also shown in FIGS. 2, 5, and 6 is a slot divider (44) which may be positioned within the "V" shaped members (30) so as to divide the lure slots (37) into smaller sub-slots for smaller lures. Each divider (44) includes an upper paddle portion (45) which rests upon a member (30) and projects into the nest (36), a contiguous neck portion (46) which extends through gap or slot (37), and a depending lower paddle portion (47) which extends into the lower compartment (34).

FIG. 7 depicts a second embodiment of the crankbait storage apparatus, preferably manufactured of plastic by injection molding, which utilizes only a single housing shell (50) together with a hinged cover (52). The cover (52) can be fastened, as with bolts at (53), to a boat swivel seat (54), or other boat component. A stop (55) is affixed to the cover (52) side opposite the hinge to control the pivoting of the shell (50) with respect to the cover (52). As can be seen, the lure storage tray (20) functions in the same manner as in the previous embodiments.

Obviously, many modifications and variations of the present invention are possible in light of the above teachings. It is therefore to be understood that, within the scope of the appended claims, the invention may be practiced otherwise than as specifically described.

We claim:

1. A storage apparatus for fishing lures having elongate bodies and a hook carrying shank extending therefrom, comprising:

(a) a storage case;
(b) a support plate pivotally attached to said storage case; and
(c) a plurality of "V" shaped members having a first end and a second end, said members residing in side by side relation and attached at said first end to said support plate and extending therefrom within said storage case to create a plurality of lure storage compartments.

2. The storage apparatus as recited in claim 1, further comprising means, formed in said members, for limiting the swing of the hook carrying shanks.

3. The storage apparatus as recited in claim 2, further comprising a divider removably disposed on said members to create lure subcompartments.

4. The storage apparatus as recited in claim 3, wherein said storage case includes a lower portion, a cover hinged to said lower portion, and said cover of said storage case is substantially a mirror image of said lower portion of said storage case.

5. The storage apparatus as recited in claim 4, further comprising means adjacent the second end of said members for retaining the lures within the storage apparatus.

6. A storage apparatus for fishing lures having elongate bodies and a hook carrying shank extending therefrom, comprising:
(a) a storage case having a lower portion with four sides with a bottom and a cover;
(b) a support plate hinged to one side of said storage case; and
(c) a plurality of "V" shaped longitudinal members having a first end and a second end, said longitudinal members residing in a horizontally disposed, side by side relation and attached at said first end to said support plate and extending therefrom within said lower portion of said storage case to create a plurality of lure storage compartments.

7. The storage apparatus as recited in claim 6, further comprising means, formed in said members, for limiting the swing of the hook carrying shanks.

8. The storage apparatus as recited in claim 7, further comprising a divider removably placed on said longitudinal members to create lure subcompartments.

9. The storage apparatus as recited in claim 8 wherein said cover of said storage case is substantially a mirror image of said lower portion of said storage case.

10. The storage apparatus as recited in claim 9, further comprising means adjacent the second end of said longitudinal members for retaining the lures within the storage apparatus.

* * * * *